Nov. 14, 1967  K. KUHN  3,352,292
DEVICE FOR CONNECTING COOLED VALVES OF MACHINES OR THE
LIKE, AND ITS VARIOUS APPLICATIONS
Filed July 29, 1965  3 Sheets-Sheet 1

United States Patent Office 3,352,292
Patented Nov. 14, 1967

3,352,292
DEVICE FOR CONNECTING COOLED VALVES OF MACHINES OR THE LIKE, AND ITS VARIOUS APPLICATIONS
Karl Kühn, Saint-Germain-en-Laye, France, assignor to Societe d'Etudes de Machines Thermiques, Saint-Denis, Seine, France, a corporation of France
Filed July 29, 1965, Ser. No. 475,830
Claims priority, application France, July 31, 1964, 983,919
8 Claims. (Cl. 123—41.41)

ABSTRACT OF THE DISCLOSURE

A device for separate cooling of a valve or like closing member in a machine having a main cooling circuit system.

The branch circuit passing through the valve is connected to the main cooling circuit valve by feed pipe and return pipe having at least one deformable portion.

The forced circulation of cooling fluid in the branch circuit passing through the valve is facilitated on the one hand by flow restricting means provided in the main cooling circuit system between the feed pipe and the return pipe and on the other hand by end portions of the feed pipe and the return pipe respectively, projecting endwise in a chamber which forms a part of the main cooling circuit system.

---

The present invention has essentially for its objects a device for connecting the internal circulation system for cooling fluid of a valve in a machine or of a like movable closing member, of the cooled type, to a cooling circuit, as well as its various applications.

Cooled valves are already known wherein the internal ducts for circulating the cooling fluid are connected by means of respectively input or inlet, or output or outlet, flexible or pliable coupling hoses, constituting respectively the input or inlet line, and the output, outlet or return line, to a special cooling circuit generally separate from the main cooling system for the hot portions of the machine on which this valve is mounted. This arrangement is attended by various inconveniences, for example those resulting from the organic or constructional complexity due to the necessity of providing an auxiliary cooling circuit specially intended for valve cooling and comprising all the accessories necessary for producing a satisfactory forced circulation of the auxiliary cooling fluid.

It is the scope of the present invention to practically eliminate the inconveniences set forth hereinabove by providing an efficient and reliable supply of cooling fluid to the valve which utilizes only static means and a simple and economical structure. To this end, the device according to this invention is remarkable notably in that it comprises connecting means whereby it communicates directly with the preferably single, main or general cooling circuit of the machine. This arrangement is advantageous in that it is extremely simple since it requires only one cooling circuit which is common to the machine and to the cooled valves.

According to another feature of the invention, the aforesaid means consist of at least two pipes or the like, respectively an inlet pipe and a return pipe, rigid with the cylinder-head or valve casing or a corresponding portion of the casing of the machine concerned, each pipe being connected at one end to a flexible coupling hose aforesaid and opening at the opposite end into an internal inlet or return chamber or duct of said valve casing, through which the fluid for cooling said valve is caused to flow.

According to another feature characterizing this invention, the aforesaid opposite end of each pipe aforesaid projects somewhat into said relevant chamber so as to be surrounded by the stream of cooling fluid in which it is immersed, the plane of the orifice at said opposite projecting end extending preferably substantially at right angles to the local direction of flow of said fluid stream about said end.

According to a further feature of this invention the diameter of said opposite end of each pipe is smaller than that of the corresponding chamber aforesaid in order to provide an annular space surrounding said opposite end.

Due to these two last-named features the return fluid stream flowing around the outlet end of the return pipe in the corresponding return chamber produces by entrainment an aspirator or suction effect creating a relative vacuum in the vicinity of said outlet end whereas at the input end of the input or inlet pipe the dynamic pressure of the fluid stream striking the front face of the inlet orifice of this input end creates a relative overpressure. Thus; the relative pressure differential prevailing in the vicinity respectively of the input end of the inlet pipe and of the outlet end of the return pipe creates a load sufficient to cause the cooling fluid to circulate in the branch circuit provided for cooling the valve. The present invention is also concerned with the various applications of the aforesaid device, notably to cooled exhaust or scavenging valves of power generating or receiving machines such as thermal engines, compressors, pumps or the like, and more particularly large-sized combustion engines and internal combustion engines of the heavy-oil diesel type. This application is remarkable notably in that these devices are branched directly off the cooling circuit of the valve casing or cylinder liners by means of the aforesaid chambers or ducts, constantly communicating with the water-jackets or like portions of said cylinders.

Other features and advantages of the present invention will appear as the following more detailed description proceeds.

In the diagrammatic drawings attached hereto and given only by way of example to illustrate a specific form of embodiment of the invention as applied to the cooled exhaust valves of a heavy-oil diesel engine:

Figure 1:
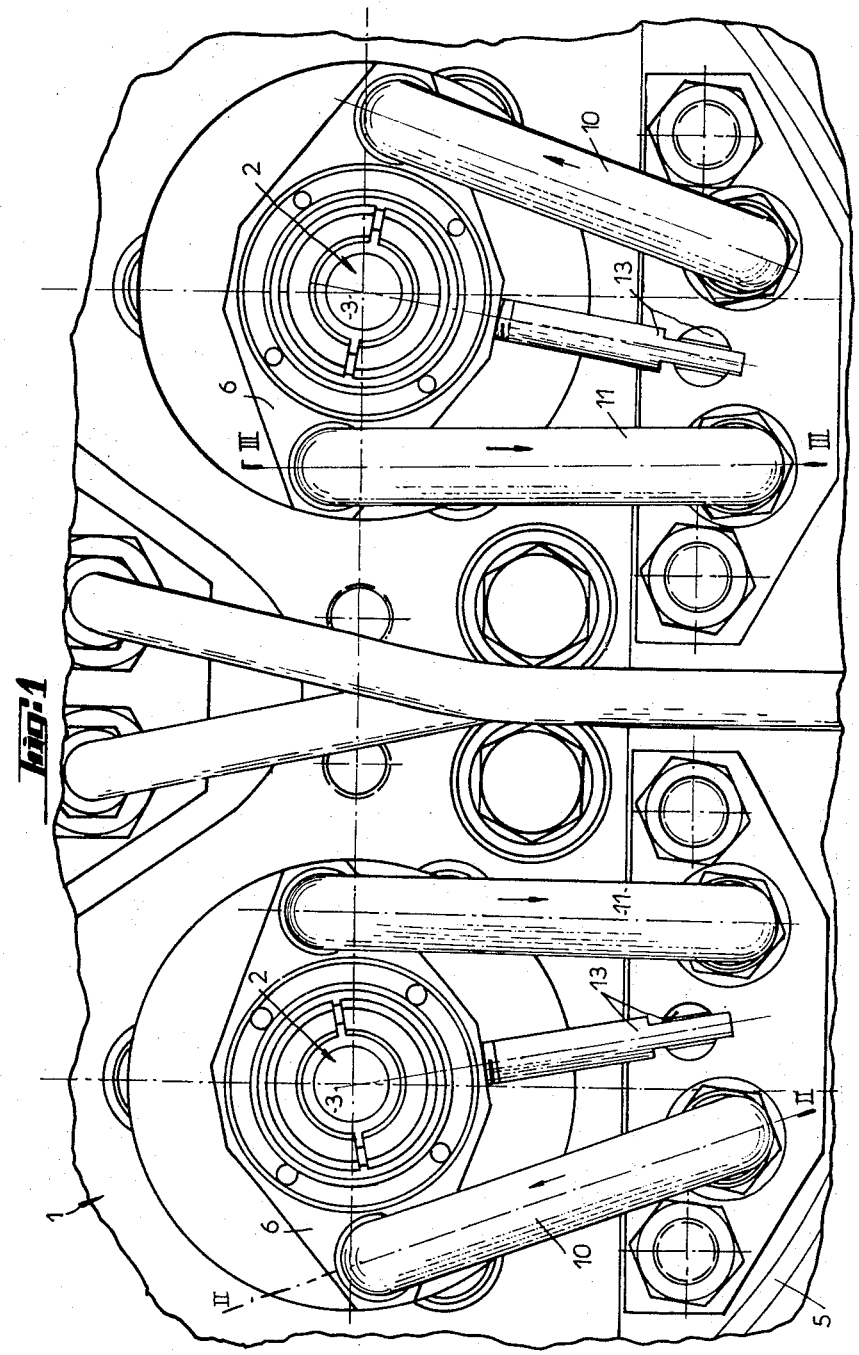
FIGURE 1 illustrates in fragmentary plan view from above the cylinder-head of the engine with two cooled exhaust valves disposed substantially symmetrically in relation to a median plane.
Figure 2:
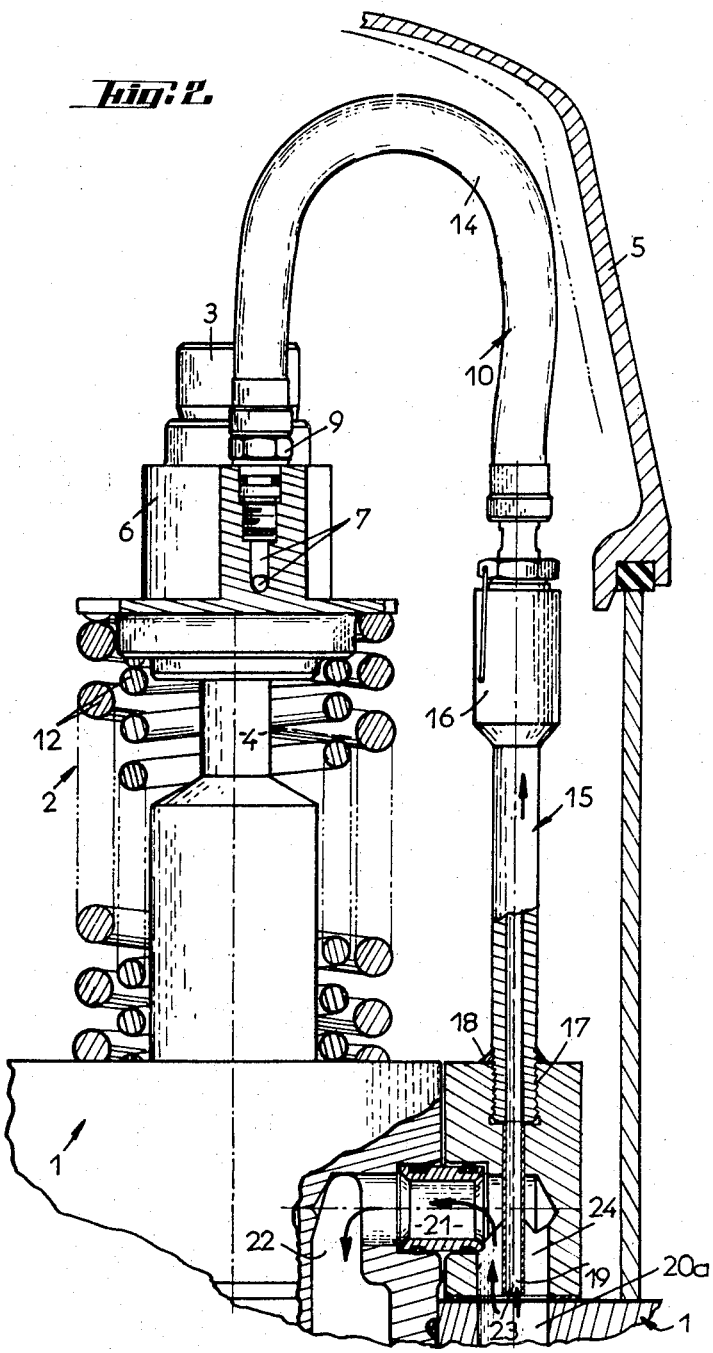
FIGURE 2 is a side elevational view partially in section with parts broken away, the section being taken upon the line II—II of FIGURE 1, showing the feed or inlet connecting duct.
Figure 3:
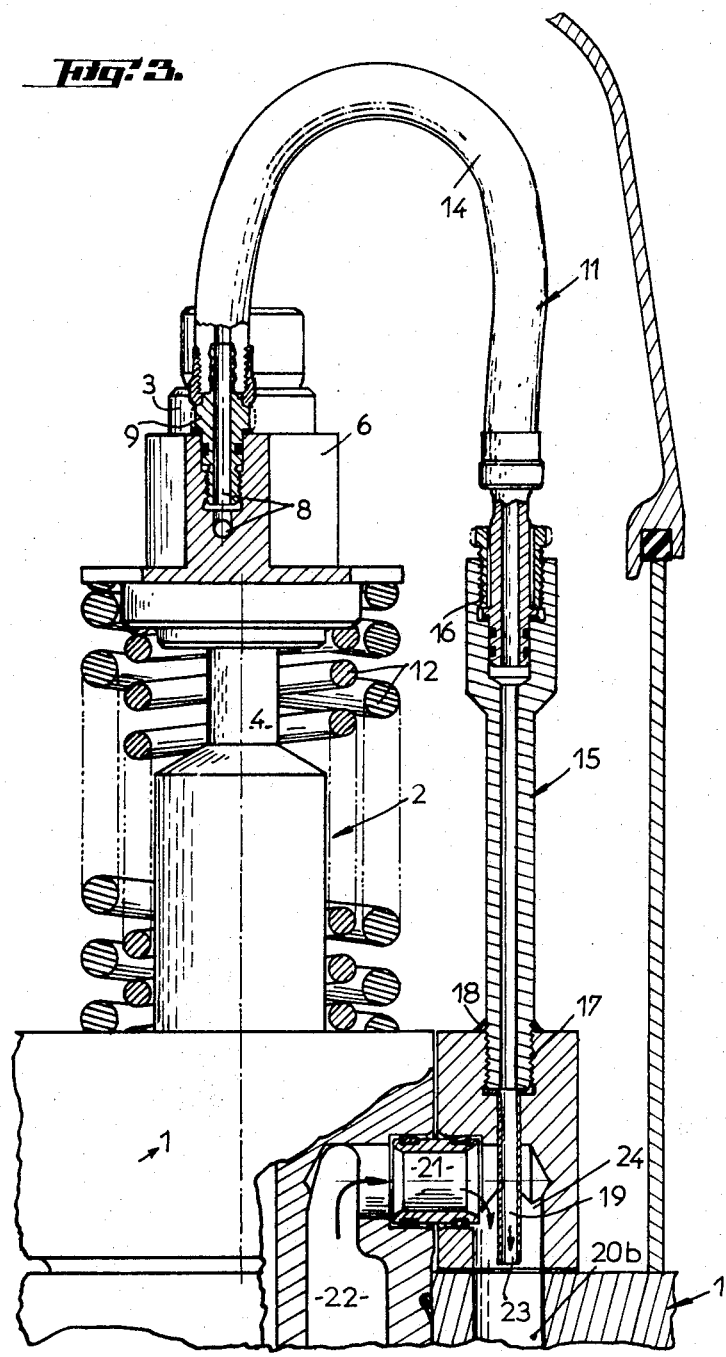
FIGURE 3 is a similar view taken upon the line III—III of FIGURE 1 but showing the exhaust or discharge connecting duct.

In the form of embodiment illustrated in the figures the reference numeral 1 designates one portion of the cylinder head of a diesel engine with two exhaust valves such as 2 of which the free end of a valve shank 4 is visible at 3, this end being operated by the arm of a rocker (not shown). FIGURES 2 and 3 illustrate the protection cover 5 enclosing in a fluid-tight manner the upper portion of the cylinder head as well as all the component elements emerging therefrom, this cover being omitted in FIGURE 1 for the sake of clarity.

The uppermost portion of the valve shank 4 comprises a member 6 constituting a connection socket whereby the respectively input and output orifices for the cooling fluid, through which the corresponding ducts in the tubular or hollow shank 4 open to the outside, are connected to the general cooling circuit. To this end, the valve socket comprises at least two ducts 7, 8, namely an inlet duct 7 and an outlet duct 8, visible in FIGURES 2 and 3, opening respectively in front of the aforesaid input and output orifices of valve shank 4. At the opposite end each duct 7, 8 terminates with an orifice provided with a fluid-tight connector 9. These connectors 9 are branched respectively on the feed pipe 10 (see FIGURE 2) and on the return pipe 11 (see FIGURE 3).

On the other hand, the socket 6 is provided with a shoulder or flange constituting a valve spring retainer engaged by the upper end of the valve springs 12, this socket moving bodily with the valve during its rectilinear reciprocation. During this movement the relative positions or orientations of the socket 6 and valve shank 4 are kept in a fixed relationship due to the provision of suitable guiding means 13 shown in diagrammatic form in FIGURE 1.

The feed and return ducts 10 and 11 have substantially the same configuration and consist each of a flexible hose 14, for example of suitable synthetic material having one end connected in a fluid-tight manner to the connector 9 and the opposite end connected to a fixed pipe or like member 15 rigid with the valve casing 1 of the cylinder-head or engine crankcase. The provision of said flexible hose 14 permits a substantially inobstructed movement of the valve 2 in relation to the pipe 15 which to this end is advantageously disposed substantially parallel to the valve shank 4, that is, parallel to the direction of the rectilinear reciprocating motion of valve 2. The connection between the flexible hose 14 and the rigid pipe 15 may advantageously consist of a union 16 of a type known per se, or of the packing type. For ensuring a fluid-tight connection between the pipe 15 and the cylinder head 1 this pipe 15 is preferably screwed by means of a threaded portion in a corresponding tapped hole 17 formed in the valve casing to which said pipe 15 is also connected by a fluid-tight weld seam 18 surrounding said pipe. The free lower end 19 of pipe 15 projects into a cavity or chamber constituting respectively an inlet chamber 20a or a return chamber 20b for the cooling fluid, this chamber constantly communicating, for example by means of a passageway 21, with an annular space or cavity 22 constituting a "wet" liner or cooling passage in a valve casing of the engine.

The end 19 of each pipe 15 is preferably so directed in relation to said chamber 20a or 20b that its end orifice 23 has its plane disposed substantially at right angles to the direction of flow of the stream of cooling fluid. The diameter of this end 19 is advantageously substantially smaller than that of the cavity or chamber 20a or 20b in order to constitute about the pipe end 19 an annular space 24 communicating with the passageway 21 behind this orifice 23. The chambers 20a, 22 and 20b of the valve casing constitute sections of the main cooling circuit of the engine, which are arranged in series.

The operation of this device is particularly simple. The relatively cold cooling fluid, generally a liquid consisting for example of water, flows through the cavity 20a (see FIGURE 2) on the one hand through the passageway 21 into the liner or jacket 22 of the cylinder head and of the cylinder proper, and on the other hand through the orifice 23 into the feed line 10, that is, firstly along the rigid pipe 15 and then along the flexible hose 14 so as to flow along the valve shank 4 through the inlet duct 7 connecting socket 6. The relatively hot fluid flows back from the valve shank 4 through the discharge duct 8 (see FIGURE 3) of socket 6 and then along the return line 11, that is, firstly along the corresponding flexible hose 14 and then along the corresponding rigid pipe 15 so as to emerge from the orifice 23 into the return chamber 20b of the cylinder head. The forced circulation of cooling fluid in the branch circuit passing through the exhaust valve is facilitated mainly by the pressure differential prevailing in the orifices 23 in chambers 20a and 20b. In fact, due to the projecting portion of the end 19 of each pipe 15 which is immersed in the fluid stream substantially parallel to the direction of flow thereof, the dynamic pressure of the fluid impinging against this orifice 23 in the feed chamber 20a causes this fluid to penetrate into the line 10 by virtue of the relative overpressure thus created across this orifice 23 in said cavity 20a since this orifice lies upstream in relation to the position of the passageway 21. In the return chamber 20b, on the other hand, the orifice 23 of the end portion 19 of pipe 15 lies substantially downstream in relation to the corresponding passageway 21, whereby the fluid stream from this passageway 21, which soaks the end portion 19 of pipe 15, by flowing freely in the direction of the orifice 23, produces by entrainment an aspirator or suction effect creating a relative vacuum across said orifice 23 in the return chamber 20b thus promoting the return flow of hot fluid towards the outlet end of pipe 15.

The provision of at least one passageway such as 21 in the cooling circuit section disposed internally of the valve casing, this passageway comprising preferably a throttled or restricted portion consisting for example of a gaged orifice or diaphragm interposed between the inlet and outlet ends of said circuit section, will thus create an additional resistance to the fluid flow which will also assist in producing said pressure differential and promote the penetration of cooling fluid into the orifice 19 of the input pipe 15 of FIGURE 2.

With the device of this invention which constitutes a circuit branched directly off the main cooling circuit of the engine, the cooling of each exhaust valve is very considerably simplified and improved, which is very important due notably to the fact that certain heavy fuels tend to attack or corrode the valve metal when the valve temperature exceeds a certain value.

Instead of utilizing flexible connecting hoses, each deformable connecting line 10, 11 may consist of at least one rigid tube having one end connected to the relevant valve and its opposite end connected for example by means of a fluid-tight knee-joint of the swivel or like type to the corresponding pipe connected in turn to the valve casing, preferably by means of a rotary packing or like joint.

According to a modified form of embodiment, the knee or rotary joint aforesaid may be replaced with a sliding joint, for an adequate specific shape, relative angular position and mutual disposals of said rigid tube.

According to another modified form of embodiment each deformable or flexible connecting pipe may consist of at least one coil tube or the like, mounted for example substantially coaxially to the relevant valve and having one end connected to this valve and the other end connected to the corresponding duct or pipe.

This invention is also applicable to the cooling of valve seat by forced circulation of a fluid.

Of course, this invention should not be construed as being limited by the specific form of embodiment shown and described herein by way of example, since many modifications may be brought thereto without departing from the scope of the invention as set forth in the appended claims.

What I claim is:

1. A fluid-cooled machine construction comprising at least one main cooling circuit system including a machine casing, fluid-cooled movable valve means providing with coolant inlet and outlet means respectively, valve box means in said machine casing for accommodating said valve means, coolant feed and return duct-like cavity means in said casing through which flows said cooling fluid, deformable coupling pipe means connected at one end thereof to said coolant inlet and outlet means, respectively, and feed piping means and return piping means directly connecting the other end of said deformable coupling pipe means respectively, to said main cooling circuit system, said feed piping means and return piping means extending into and being rigidly connected to said valve box means and opening endwise oppositely to their ends connected to said deformable coupling pipe means into said associated feed duct-like cavity means and return duct-like cavity means respectively, said feed piping means and said return piping means projecting endwise by corresponding inner projecting portions into said associated feed duct-like cavity means and return duct-like cavity means, respectively, so as to be surrounded by the flow of coolant, each inner projecting portion having a diameter less than that of the associated cavity means so as to define therewith an annular space and being formed with a substantially plane end opening, the plane of which is substantially at right angles to the direction of local flow of said coolant in the vicinity of said opening.

2. A device according to claim 1, comprising inner cooling circuit means provided in said valve box means and including flow restricting means.

3. A device according to claim 2, wherein each deformable coupling pipe means consist of at least one flexible hose member.

4. A device according to claim 2, wherein each deformable coupling pipe means comprises at least one substantially rigid tube fitted at one end thereof to the associated valve means and at its other end to the corresponding pipe means through movable toggle sealing connection means, said piping means being connected to said valve box means through revolving sealing joint means.

5. A device according to claim 2, wherein each deformable coupling pipe means, consists of at least one spring-like tubular coil mounted coaxially with the associated valve means and connected thereto at one end while being connected at the opposite end to the corresponding piping means.

6. A device according to claim 2, wherein each deformable coupling pipe means consists of at least one substantially rigid tube connected at one end to the associated valve means and at its other end to the corresponding piping means through sealing slip-joint means.

7. A device according to claim 2, wherein said machine comprises at least one water-jacketed cylinder having a reciprocating piston movable therein; at least one cylinder head containing said valve box means with said fluid-cooled valve means consisting of at least one intake valve and at least one exhaust valve for a working fluid; and duct means connecting said feed and return duct-like cavity means to the water-jacket of said cylinder for permanent communication therewith.

8. A fluid-cooled machine construction comprising at least one main cooling circuit system including a machine casing, fluid-cooled movable valve means provided with coolant inlet and outlet means respectively, valve box means in said machine casing for accommodating said valve means, coolant feed and return duct-like cavity means in said casing through which flows said cooling fluid, deformable coupling pipe means connected at one end thereof to said coolant inlet and outlet means, respectively, and feed piping means and return piping means directly connecting the other end of said deformable coupling pipe means, respectively, to said main cooling circuit system, said feed piping means and return piping means extending into and being rigidly connected to said valve box means and opening endwise oppositely to their ends connected to said deformable coupling pipe means, into said associated feed duct-like cavity means and return duct-like cavity means respectively, and inner cooling circuit means provided in said valve box means and including flow restricting means, said flow restricting means consisting of a cross-sectionally reduced passageway located immediately adjacent and downstream of the inlet of said feed piping means and adapted to produce the pressure head inducing the flow of coolant into said feed piping means.

References Cited
UNITED STATES PATENTS

| | | | |
|---|---|---|---|
| 975,255 | 11/1910 | Koven | 132—41.41 |
| 1,281,246 | 10/1918 | Sturtevant | 123—41.41 |
| 2,585,540 | 2/1952 | Daub | 123—41.41 |

AL LAWRENCE SMITH, *Primary Examiner.*